United States Patent
Sethi et al.

(10) Patent No.: US 10,908,811 B1
(45) Date of Patent: Feb. 2, 2021

(54) SYSTEM AND METHOD FOR IMPROVING A GRAPHICAL MENU

(71) Applicant: DELL PRODUCTS, LP, Round Rock, TX (US)

(72) Inventors: Parminder Singh Sethi, Ludhian (IN); Madhuri Dwarakanath, Bangalore (IN); Avinash Vishwanath, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/717,183

(22) Filed: Dec. 17, 2019

(51) Int. Cl.
- *G06F 3/0482* (2013.01)
- *G06F 3/044* (2006.01)
- *G06F 3/0488* (2013.01)
- *G06F 3/0484* (2013.01)

(52) U.S. Cl.
CPC .......... *G06F 3/04883* (2013.01); *G06F 3/044* (2013.01); *G06F 3/0482* (2013.01); *G06F 3/04845* (2013.01)

(58) Field of Classification Search
CPC .............. G06F 3/04883; G06F 3/0482; G06F 3/04845; G06F 3/044
See application file for complete search history.

(56) References Cited

U.S. PATENT DOCUMENTS

| | | | | |
|---|---|---|---|---|
| 5,420,975 A | * | 5/1995 | Blades | G06F 3/0482 715/811 |
| 8,880,044 B2 | * | 11/2014 | Kim | G06F 3/041 455/414.4 |
| 9,477,376 B1 | * | 10/2016 | Stout | G06Q 50/01 |
| 9,720,583 B2 | * | 8/2017 | Rampson | G06F 3/0488 |
| 2001/0019338 A1 | * | 9/2001 | Roth | G06F 3/0482 715/811 |
| 2007/0192738 A1 | * | 8/2007 | Lee | G06F 3/0482 715/810 |
| 2010/0299638 A1 | | 11/2010 | Choi | |
| 2011/0202878 A1 | * | 8/2011 | Park | G06F 3/04817 715/825 |
| 2011/0234503 A1 | * | 9/2011 | Fitzmaurice | G06F 3/0425 345/173 |
| 2013/0019205 A1 | * | 1/2013 | Gil | G06F 3/0482 715/834 |
| 2013/0086056 A1 | * | 4/2013 | Dyor | G06F 3/167 707/730 |
| 2013/0088450 A1 | * | 4/2013 | Takase | G06F 3/041 345/173 |
| 2013/0212529 A1 | | 8/2013 | Amarnath | |
| 2015/0082162 A1 | | 3/2015 | Choe et al. | |
| 2015/0169168 A1 | * | 6/2015 | Vigneras | G06F 3/04883 715/739 |
| 2015/0324087 A1 | * | 11/2015 | Gregory | G06F 3/04845 345/174 |

(Continued)

*Primary Examiner* — Yongjia Pan
(74) *Attorney, Agent, or Firm* — Larson Newman, LLP

(57) ABSTRACT

A system capacitively senses a swiping motion to a touch sensitive display, determines a length associated with the swiping motion to the touch sensitive display, and displays a menu of options based on the length associated with the swiping motion. The system capacitively senses inputs to the touch sensitive display that correspond to selections from the menu, determines probabilities associated with the options, and modifies the menu based on the probabilities.

14 Claims, 11 Drawing Sheets

(56) References Cited

U.S. PATENT DOCUMENTS

2016/0147433 A1\* 5/2016 Lin ...................... G06F 3/0482
                                                    715/834
2016/0266758 A1   9/2016 Li
2017/0322723 A1\* 11/2017 Jang ...................... G06F 3/0482
2018/0129409 A1   5/2018 Lim et al.

\* cited by examiner

SYSTEM AND METHOD FOR IMPROVING A GRAPHICAL MENU

CROSS-REFERENCE TO RELATED APPLICATION

This patent application relates to U.S. application Ser. No. 16/686,836 filed Nov. 18, 2019 and incorporated herein by reference in its entirety.

FIELD OF THE DISCLOSURE

This disclosure generally relates to information handling systems, and more particularly relates to touch and swipe menu management on touch sensitive displays.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Graphical menu management may be based on historical usage. An information handling system displays a graphical user interface presenting a listing of messages, channels, or other content. When a user makes a gestural input to the touch sensitive display, the information handling system presents a menu of options. Each option in the menu of options represents an action or command (such as Reply, Forward, or Delete). As the user makes selections in the menu of options, over time the user's preferences may be learned and predicted. The information handling system may thus modify the menu of options to reflect the user's preferences.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
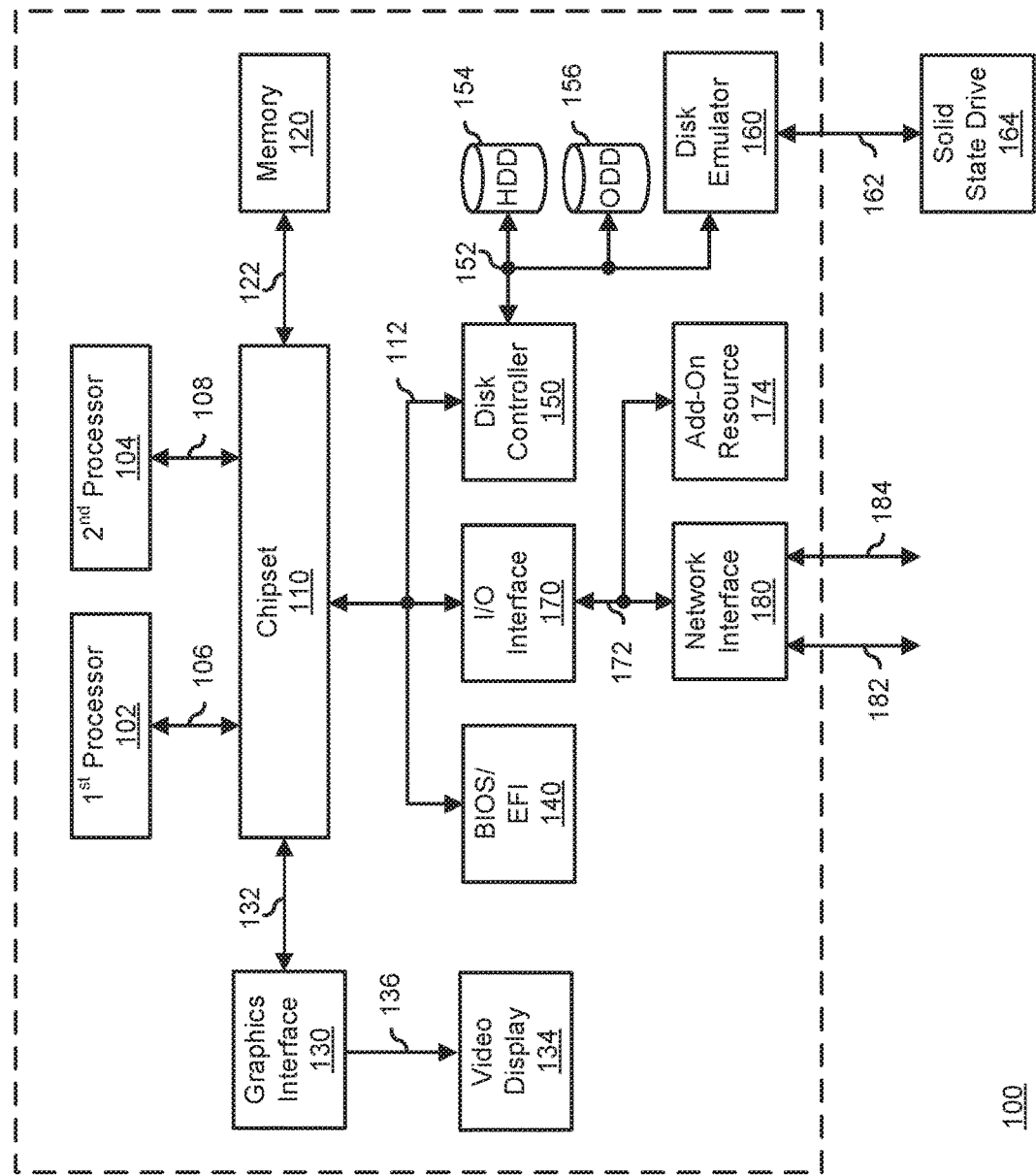
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface device 180, and a baseboard management controller (BMC) 190. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8)

PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processors 102 and 104, which provides various management functions for information handling system 100. In an embodiment, BMC 190 may be responsible for granting access to a remote management system that may establish control of the elements to implement power management, cooling management, storage management, and the like. The BMC 190 may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated into another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100. Thus BMC 190 can communicate with the remote management system via network interface 194 or the BMC can communicate with the external mobile device using its own transceiver circuitry while the resources or elements of information handling system 100 are powered off or at least in low power mode. Here, information can be sent from the remote management system or external mobile device to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Figure 2:
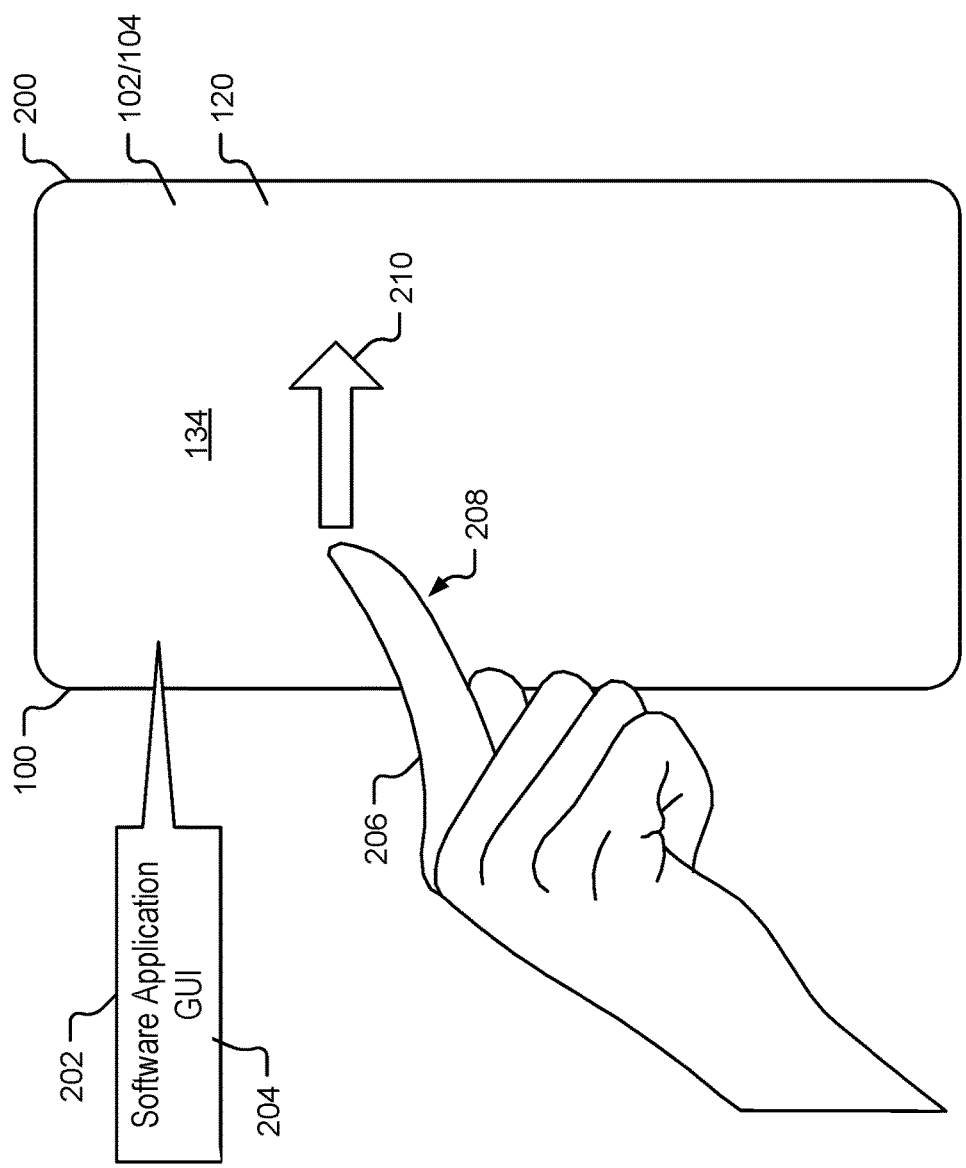
FIGS. 2-3 illustrate graphical menu configuration, according to exemplary embodiments.
Figure 3:
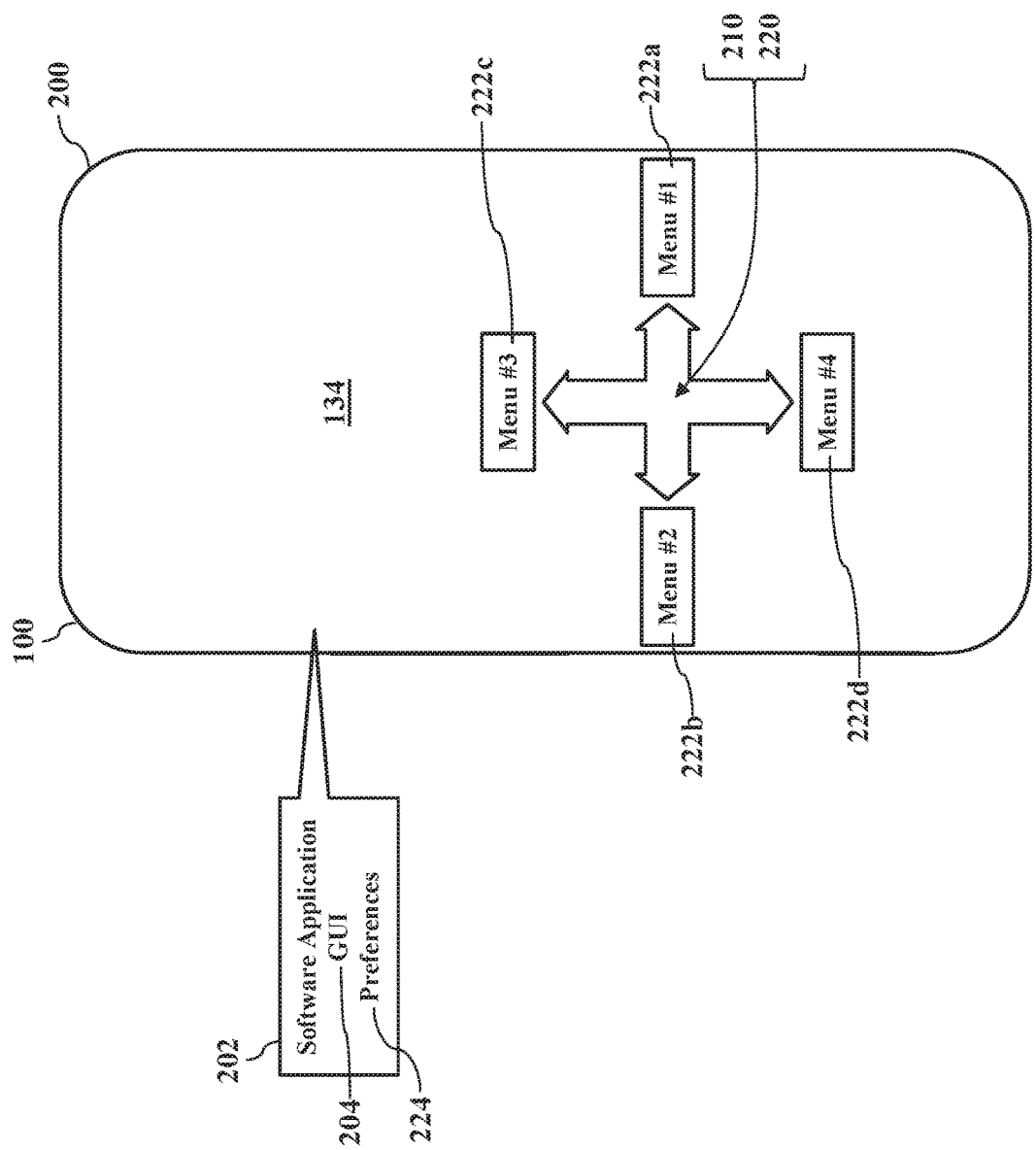

FIGS. 2-3 illustrate graphical menu configuration, according to exemplary embodiments. An information handling system such as a mobile cellular smartphone 200 includes the processor(s) 102/104 that execute a software application 202 stored in the memory device 120. When the software application 202 is executed, the software application 202 may instruct or cause the smartphone 200 to generate and display a graphical user interface (GUI) 204 on the video display 134. While the video display 134 may have any design and any construction, one common embodiment has a capacitive, touch sensitive display device. When a user's finger 206 touches the video device 134, a grid of capacitive elements (not shown for simplicity) capacitively senses the touch 208 and generates electrical output signals. Because the capacitive elements are arranged in the grid, the electrical output signals may be used to identify or infer a grid or capacitive location at which the user touched the video device 134. The smartphone 200 and the software application 202 cooperate to execute a corresponding input, selection, and/or command that is associated with the electrical output signals and/or location. The touch 208 may even be accompanied by a gesture (such as a directional swiping motion 210) that is interpreted as a corresponding action, option menu, or other function.

FIG. 3 illustrates directional configuration. When the user touches the video display 134 and enters/makes the swiping motion 210, different directions 220 of the swiping motion 210 may be defined or associated with different graphical menus 222 of options. For example, a left-to-right swipe motion 210 causes the smartphone 200 to display a first menu 222a of options. However, if the user touches and swipes in an opposite direction (such as a right-to-left swiping motion 210), the smartphone 200 and/or the software application 202 may be configured to display a second menu 222b of options. Furthermore, if the user touches and swipes in an upward direction, the smartphone 200 and/or the software application 202 may be configured to display a third menu 222c of options. A touch and downward swipe motion 210 or swiping motion 210d may be interpreted to display a fourth menu 222b of options. There may be configurations for even more directions 220 (such as diagonal swiping motions 210) and their additional, corresponding menus 222 of options. The different directions 220 and their corresponding menus 222 of options may be preconfigured by the smartphone 200 and/or by the software application 202. The user, additionally or alternatively, may select or configure preferences 224 (such as via a system or software Settings icon) that define or elect the different directions 220 and their corresponding menus 222 of options. The user's preferences 224, for example, may be established such that only certain swiping motions 210 are interpreted, while other swiping motions 210 (in different directions) may be ignored. As a simple example, the left-to-right swiping motion 210 generates/displays the first menu 222a of options. The other swiping motions 210 in different directions may be ignored and no menus are presented.

Figure 4:
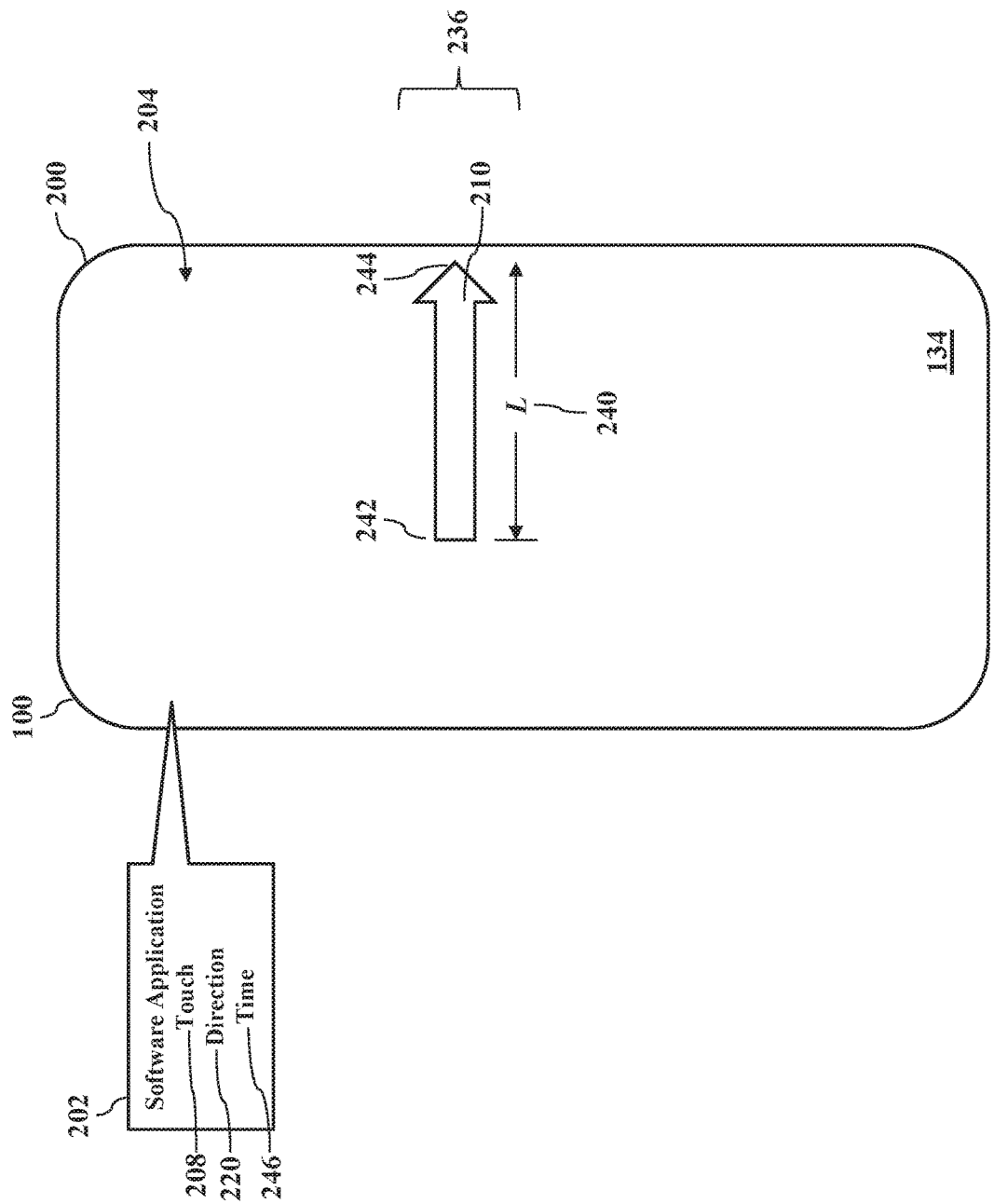
FIGS. 4-5 illustrate learning capabilities, according to exemplary embodiments.
Figure 5:
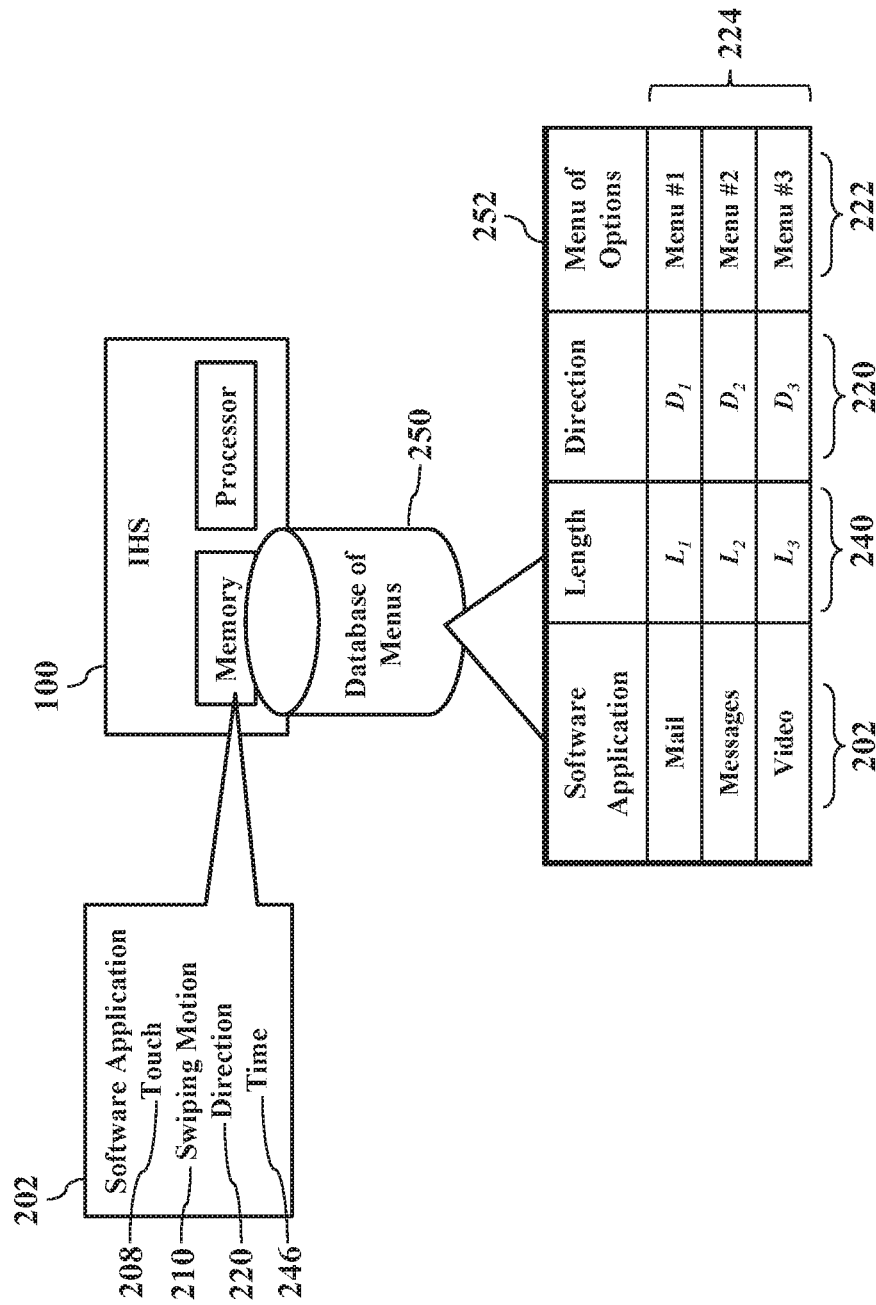
Figure 6:
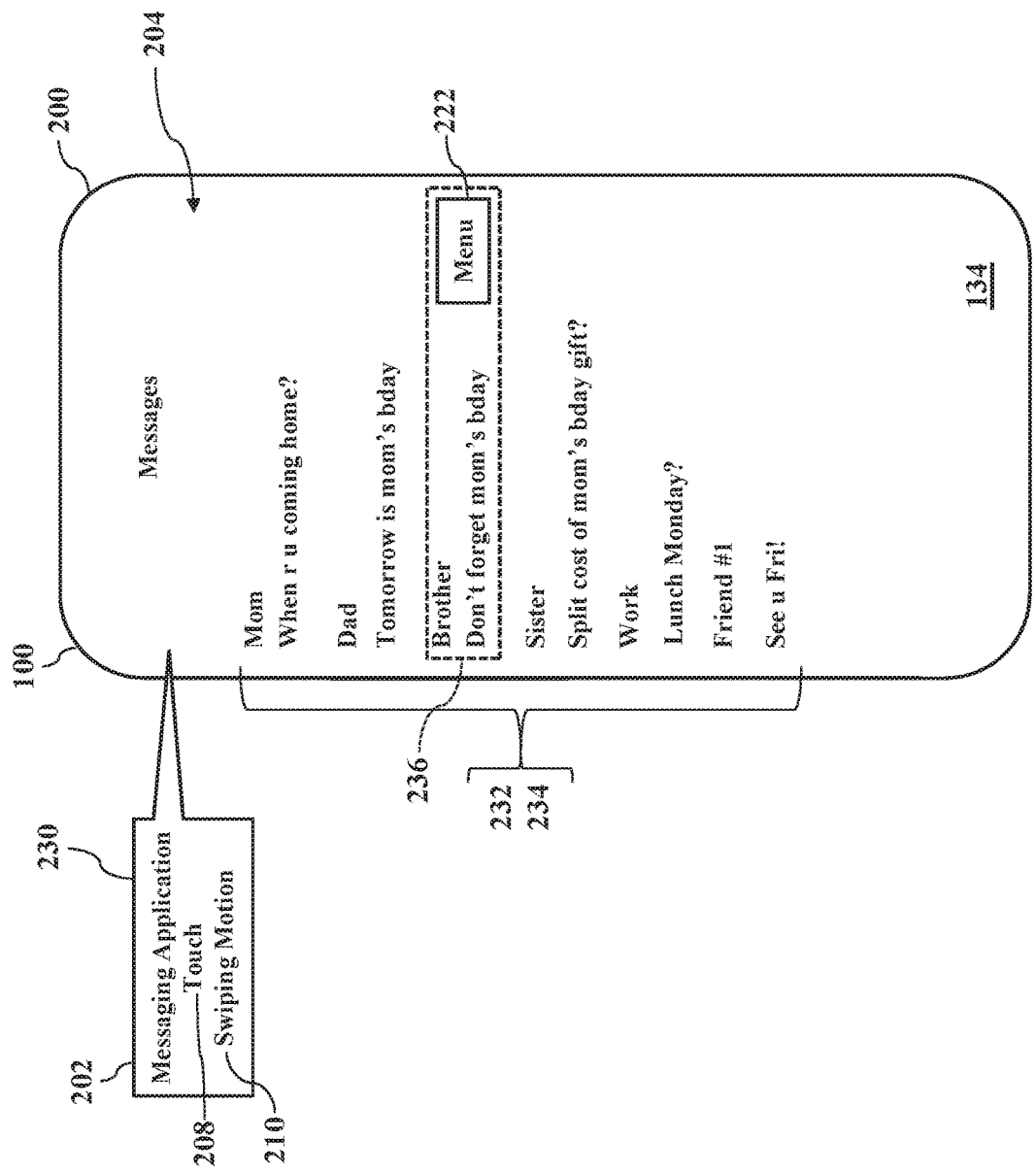
FIGS. 6-9 further illustrate learning capabilities, according to exemplary embodiments.

FIGS. 4-5 illustrate learning capabilities, according to exemplary embodiments. Here the information handling system 100 may observe, record, and learn the user's preferred swiping motions 210 and their corresponding menus 222 of options. Indeed, the user may configure or define a single swiping motion 210 to have different menus 222 of options, depending on the software application 202 being used or executed. Suppose, for example, that the user prefers the left-to-right swipe motion 210 to display a particular menu 222 of options when using an email application for sending/receiving electronic mail. However, the user may prefer the same left-to-right swipe motion 210 to display a different menu 222 of options when using a phone application for sending/receiving telephony/VoIP/Wi-Fi calls. Moreover the user may prefer the same left-to-right swipe motion 210 to display still another different menu 222 of options when using a video application such as NETFLIX®, YOUTUBE®, or HULU® for streaming videos. The user, in other words, may prefer different commands, options, and/or actions depending on the software application 202 she is using.

FIG. 4 thus illustrates characteristics, parameters, or features associated with the user's swiping motion 210. When the user inputs her swiping motion 220, its characteristics, parameters, or features may determine the corresponding option in the menu 222 of options, based on the software application 202. As an example, FIG. 4 illustrates the user's swiping motion 210 input while using the software application 202. The user's swiping motion 210 is input in the direction 220 on the display device 134. Moreover, the user's swiping motion 210 may be described or defined as a distance or length L (illustrated as reference numeral 240). When the user makes her initial touch input 208, the video display 134, the smartphone 200, and/or the software application 202 cooperate to mark or interpret the engagement with an initial location/coordinates 242. As the user then makes her contiguous, continuous swiping motion 210 (without lifting her finger), the video display 134, the smartphone 200, and/or the software application 202 cooperate to mark, trace, and/or interpret the corresponding time-based location/coordinates. When the user lifts her finger, the video display 134, the smartphone 200, and/or the software application 202 cooperate to mark or interpret the disengagement with a final location/coordinates 244. Exemplary embodiments may thus trace and/or time the swiping motion 210 from the initial location 242 to the final location 244 to determine the direction 220, the length 240, and a time 246 associated with the swiping motion 210.

FIG. 5 illustrates an artificial learning of the user's preferences. Because the user may define different swiping motions 210 and their corresponding menus 222 of options on an application-by-application basis, exemplary embodiments may store her preferences 224 as entries in an electronic database 250. As each software application 202 is opened, displayed, and/or used, the electronic database 250 tracks and stores the characteristics of her swiping motions 210 and her interactions or selections within the menus 222 of options. When the user inputs her initial touch 208 and the contiguous swiping motion 210 to disengagement, exemplary embodiments determine the particular software application 202 in which the touch 208 was input. The direction 220 and the length 240 of the swiping motion 210 is determined (as explained above). The information handling system 100 and/or the software application 202 may then consult or query the electronic database 250 to determine the corresponding menu 222 of options. The electronic database 250 is illustrated as being locally stored and maintained by the information handling system 100, but any of the database entries may be stored at any remote, accessible location via a communication network. The electronic database 124 relates, maps, or associates different software application 202 to values of the direction 220 and/or the length 240 to their corresponding menu 222 of options. While the electronic database 250 may have any logical and physical structure, a relational structure may be easiest to understand. FIG. 5 thus illustrates the electronic database 250 as a table 252 that relates, maps, or associates each software application 202 to the direction 220 and/or the length 240 to their corresponding menu 222 of options. So, once the software application 202, the direction 220, and/or the length 240 associated with the user's swiping motion 210 is determined, exemplary embodiments may query the electronic database 250 to identify its corresponding menu 222 of options. While FIG. 5 only illustrates a simple example of a few entries, in practice the electronic database 250 may have many entries that detail a rich depository of different software applications 202, different swiping motions 210, and their corresponding menu 222 of options, commands, and/or selections.

The user's preferences may thus be artificially learned. As the user makes her swiping motions 210, the electronic database 250 adds entries describing the swiping motions 210 (such as the software application 202, the direction 220, the length 240, and the menu 222 of options). Autonomous learning may thus continuously observe and learn the user's preferred actions/selections in response to the swipe motion 210. The entries are recorded for any software application 202, as many users prefer different actions for different applications. For example, some users would habitually prefer a quick "Reply" option for emails and text messages, while other users would habitually prefer a "Delete" option. As the information handling system 100 and/or the software application 202 learns the user's habitual use, the user's future usage/preferences may be predicted based on the habitual, historical usage. The menu 222 of options, in other words, is intelligently modified to offer or present the user's preferred options, actions, and/or commands in response to the sensing of the swiping motion 210. Time is saved/reduced, the user need not customize the options, and the user avoids the frustration of navigating through an entire list of actions/features.

FIGS. 6-9 further illustrate learning capabilities, according to exemplary embodiments. When the information handling system 100 (illustrated as the smartphone 200) senses or detects the user's touch 208 and the swiping motion 210, the smartphone 200 and/or the software application 202 generates and displays the corresponding menu 222 of options. For simplicity, suppose that software application 202 is a messaging application 230 that causes the smartphone 200 to send, to receive, and to log any electronic messages 232 (such as cellular SMS, instant messages, WI-FI® text messages, electronic mail messages). The messaging application 230 also causes the smartphone 200 to generate the graphical user interface 204 displaying a listing 234 of content. Here the listing 234 of content lists or presents the electronic messages 232 that have been chronologically sent and received. When the user touches an entry 236 in the listing 234 and swipes, the video display 134 senses or detects both the user's touch 208 and the contiguous swiping motion 210. The video display 134, the smartphone 200, and/or the software application 202 then cooperate to interpret the corresponding capacitive signals and to display the corresponding menu 222 of options.

Figure 7A:
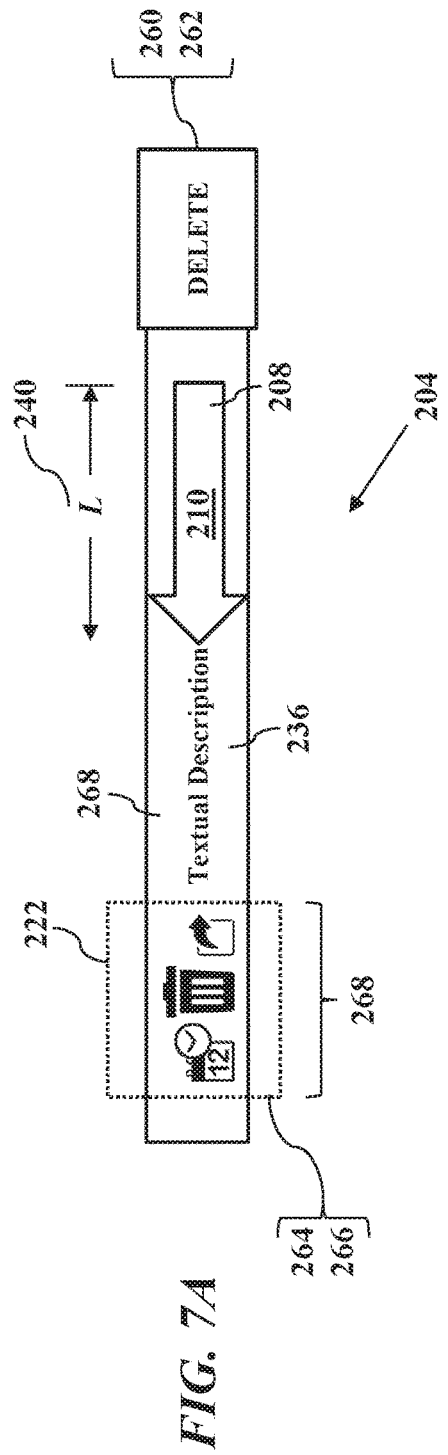
Figure 7B:
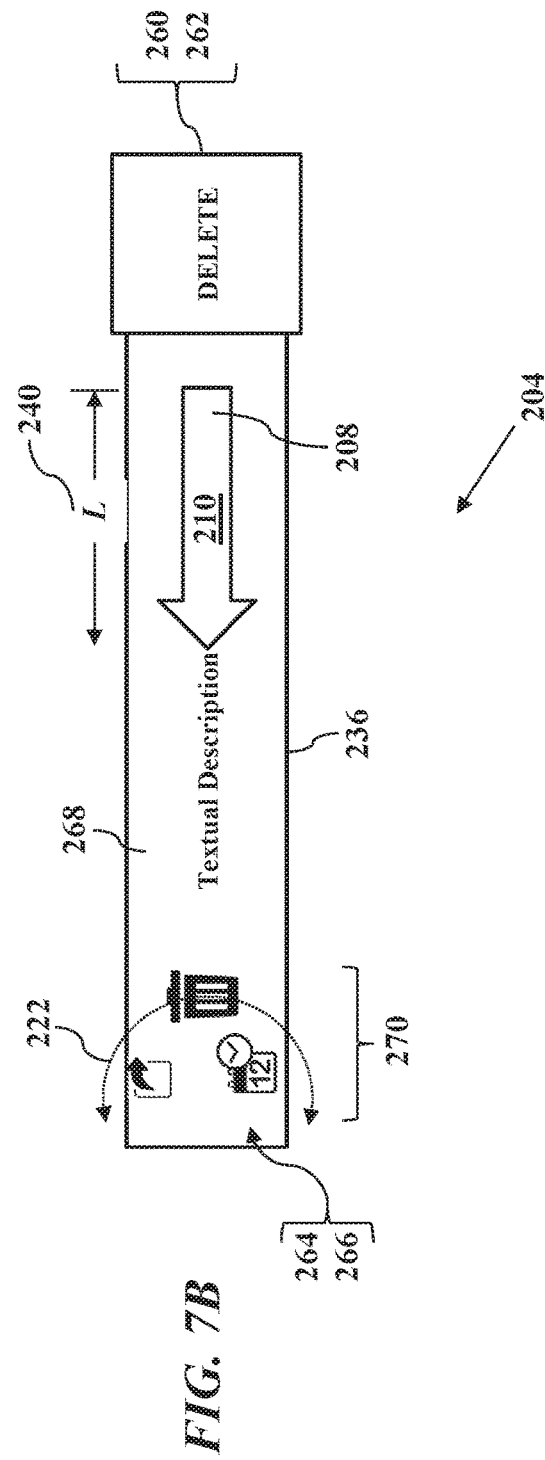

FIGS. 7A-7B further illustrate learning capabilities. When the information handling system 100 (illustrated as the smartphone 200) senses or detects the user's touch 208 and the swiping motion 210, the smartphone 200 and/or the software application 202 generates and displays the corresponding menu 222 of options. Suppose that the user touched the message entry 236 (displayed by the graphical user interface 204) and swiped to display the corresponding menu 222 of options. Here, though, the menu 222 of options may include multiple, different actions for the user's tactile selection. The menu 222 of options may thus have a first panel component 260 that displays a currently active option 262. The menu 222 of options may also have a second panel component 264 that displays one or more of the individual options 266 associated with the menu 222 of options. While the first panel component 260 and the second panel component 264 may have any size and location within, or relative to, the graphical user interface 204, FIG. 7A illustrates the panel components 260 and 264 overlaying or even obscuring one or more portions of a text field 268. The first panel component 260 and the second panel component 264, in other words, may be configured or sized (such as length, width, and/or area) to not overlay or obscure a different entry. Because there may be multiple options 266 for the user's tactile selection, FIG. 7 illustrates a horizontal listing 268 of the multiple options 306. Each different option 266 (iconically illustrated as calendaring, deleting, or forwarding the selected entry 236) may be represented for the user's tactile selection. If even more options 266 are available (but not displayed, such as due to available display space in the second panel component 264), the user may make a left/right horizontal input (for example constant engagement) to scroll along additional iconic options 266. The currently active option 262 is displayed by the first panel component 260. As the user horizontally scrolls left/right among the iconic options 266, the first panel component 260 dynamically changes to display each successive active option 262. Once the user has manipulated the menu 222 of options such that the first panel component 260 displays her desired active option 262, the user touches or selects the first panel component 260 for execution.

FIG. 7 illustrates a circular listing 270 of the multiple options 266. Each different option 266 may be represented for the user's tactile selection. The user may make clockwise or counter clockwise inputs (such as constant engagement) to semi-circularly scroll along additional iconic options 266. The currently active option 262 in the menu 222 of options may thus be displayed by the first panel component 260. As the user scrolls among the iconic options 266, the first panel component 260 changes to display the associated currently active option 262. Once the user has manipulated the circular listing 270 such that the first panel component 260 displays her desired active option 262, the user touches or selects the first panel component 260 for execution.

Figure 8:
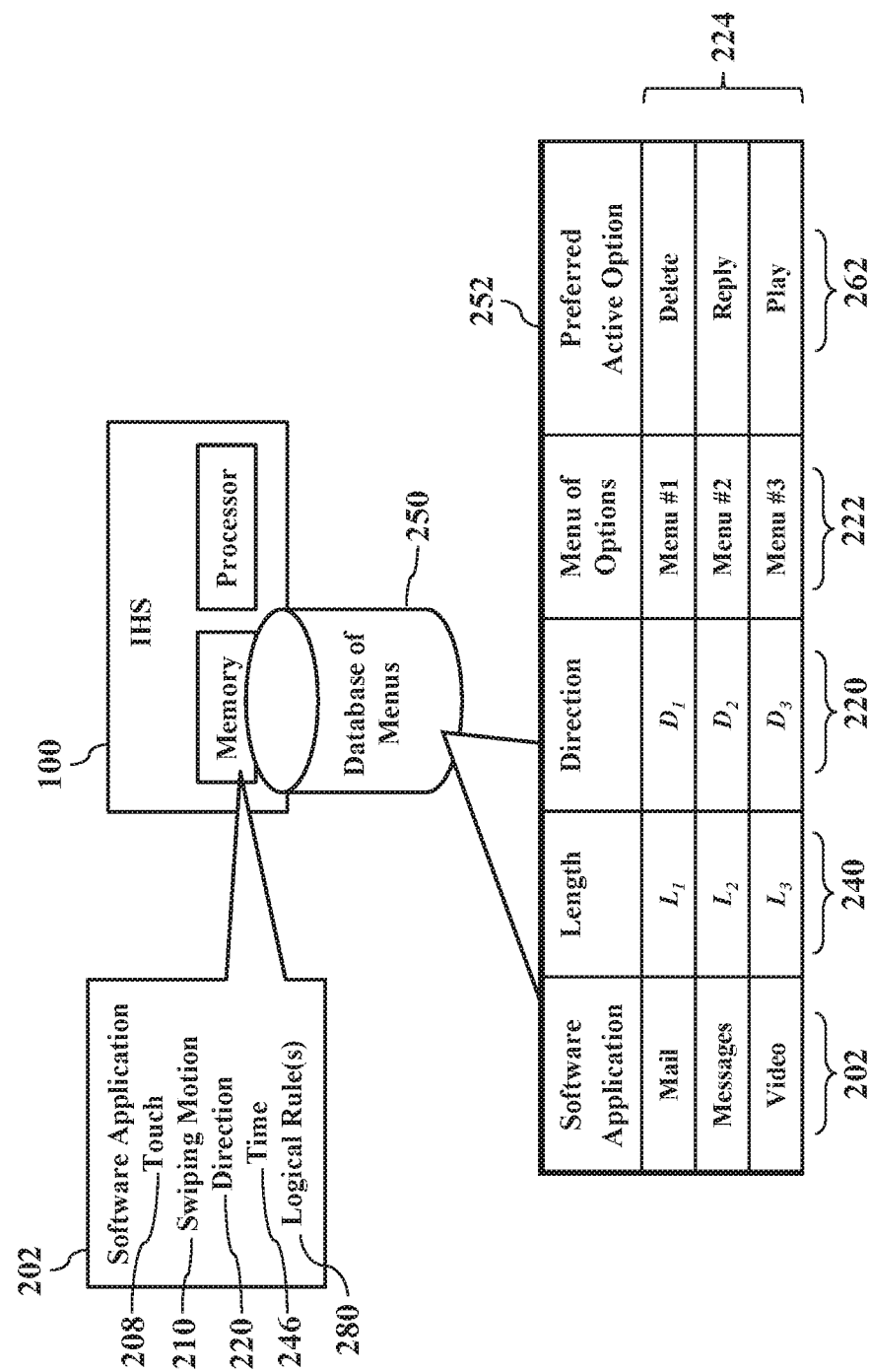

FIG. 8 also illustrates an artificial learning of the user's preferences. As the user's inputs and/or selections within the menu 222 of options are monitored, the information handling system 100 and/or the software application 202 may identify, retrieve, and/or execute various logical rules 280. The logical rules 280 are logical statements for specifying the user's preferred ordering or selections in the menus 222 of options. As an example, suppose the information handling system 100 and/or the software application 202 tracks, counts, or sums the number of times each option 266 in the menu 222 of options is selected by the user for execution. The logical rules 280 may then determine the option 266 having the greatest value selected by the user for execution. The logical rules 280, in other words, may determine a ranking of the user's selections in each menu 22 of options on an application-by-application basis. The user's most frequent or popular selection in each software application 202 is determined and logged as the user's preferred active option 262. So, when the information handling system 100 and/or the software application 202 senses or detects the user's touch 208 and the swiping motion 210, the information handling system 100 and/or the software application 202 identifies the corresponding menu 222 of options and also the user's preferred active option 262. The information handling system 100 and/or the software application 202 then modify the menu 222 of options to be displayed, with the user's preferred active option 262 listed first, top, or otherwise more prominently than other less popular options 266. The user's preferred active option 262, for example, may be initially displayed by the first panel component 260 (illustrated by FIGS. 7A & 7B). Because the user's preferred active option 262 is her most popular, numerous, or frequent selection, the information handling system 100 and/or the software application 202 first displays the user's preferred active option 262.

The user's selections in the menu 222 of options may be ranked. Because the information handling system 100 and/or the software application 202 tracks, counts, or tallies the number of times each option 266 in the menu 222 of options is selected by the user, the logical rules 280 may determine a ranking of any and/or all the user's selections from the menu 22 of options. The logical rules 280 may then present the options 266 in numerical rank order, with lesser ranking options 266 unseen or not displayed without scrolling. Moreover infrequently-selected options 266, such as those having low rankings, may be dropped from the menu 222 of options to improve visual presentation, to increase font/text sizing, and/or to reduce display sizing. The priority or ordering of the options 266 in the menu 222 of options may thus be predicted or determined using frequency plotting, probability analysis, linear regression, or any other statistical analysis or technique. The number of the options 266 presented in the menu 222 of options may also be truncated, dropped, or reduced according to an analysis of the user's selections.

Figure 9:
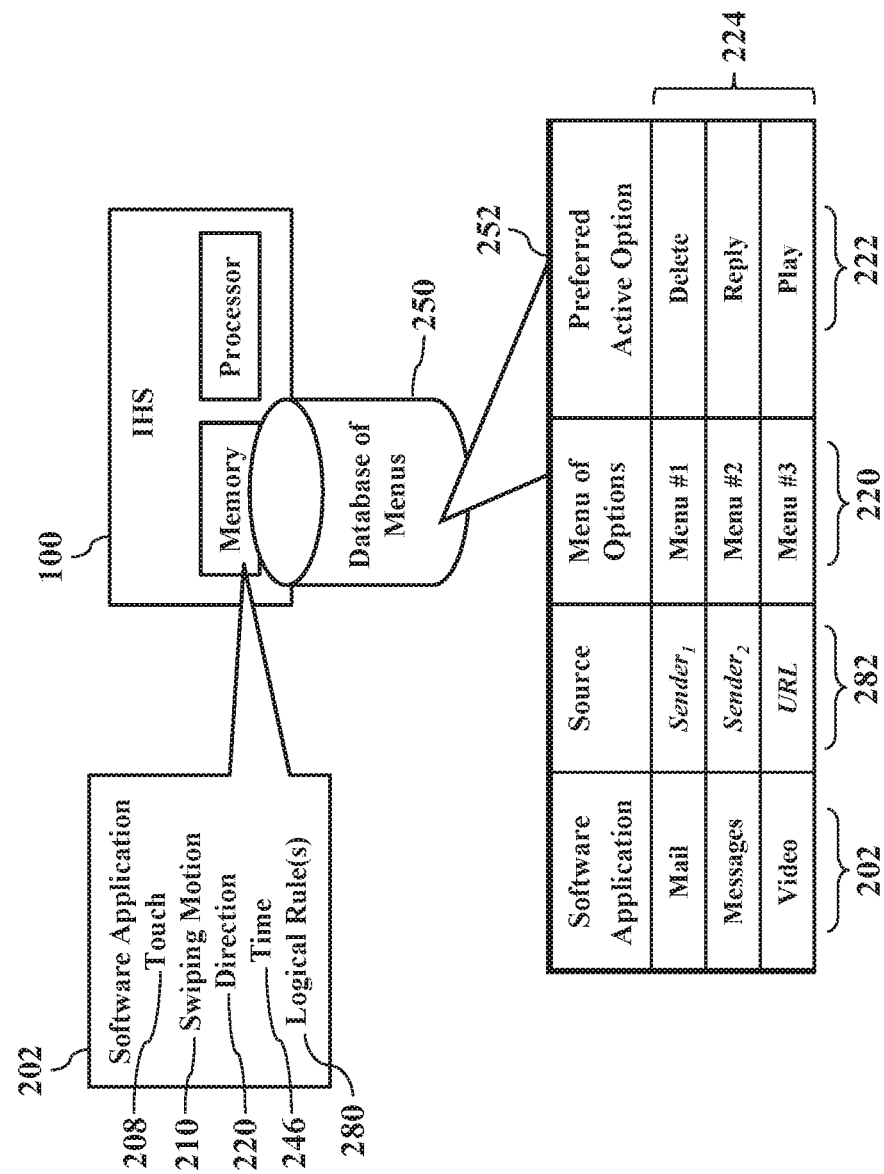

FIG. 9 further illustrate learning capabilities based on content characteristics. Here the information handling system 100 and/or the software application 202 may monitor, track, and/or log any characteristic of any electronic content to define or configure the menu 222 of options. Suppose, for example, the logical rules 280 are specified in terms of a sender or source 282 for any electronic content. The options 266 in the menu 222 of options may be arranged or ranked according to the sender or source 282 of any electronic content. As the reader likely understands, text messages from close friends and family are usually replied, while text messages from strangers and spam are frequently deleted. Calls from close friends and family are usually answered/accepted, while calls from unknown numbers are usually ignored. Webpage links and other electronic content from trusted sources may be downloaded, while content from untrusted or unknown sources may be deleted. FIG. 9 thus illustrates the electronic database 250 having additional entries that track the sender or source 282 of electronic content to further determine the corresponding menu 222 of options. When any electronic content is received or displayed, entries are added to log the particular software application 202 processing the electronic content and the sender or source 282. The logical rules 280 may determine probabilities, rankings, or frequencies of any and/or all the user's selections from the menu 22 of options, based on the software application 202 and/or the sender or source 282. When the user makes a future swiping motion 210, the logical rules 280 may then modify and present the options 266 in numerical rank order, with the user's most likely, preferred active option 222 prominently displayed (such as via the first panel component 260 illustrated by FIGS. 7A & 7B).

Figure 10:
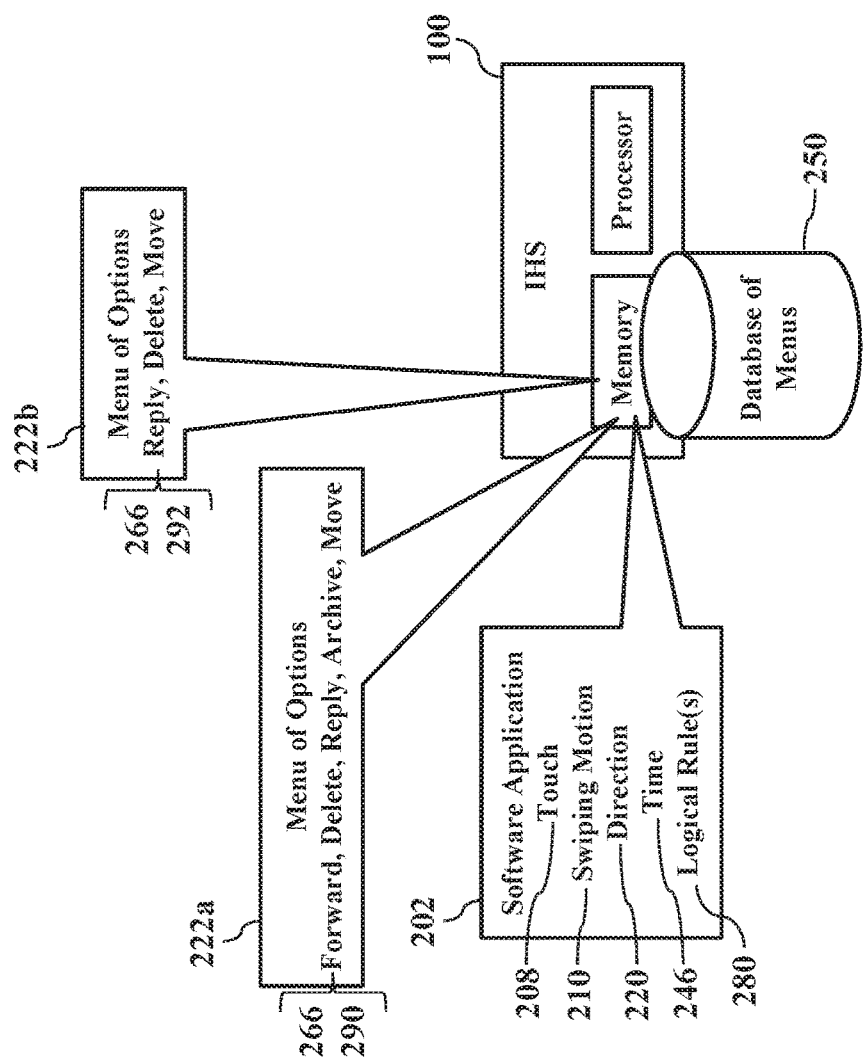
FIG. 10 illustrates local learning, according to exemplary embodiments.

FIG. 10 illustrates local learning, according to exemplary embodiments. As the information handling system 100 and/or the software application 202 monitor the user's swiping motions 210 and her selections within the menus 222 of options, the various options 266 available within the menu 222 of options may be culled, reduced, and/or eliminated for future presentations. FIG. 10, for example, illustrates an initial set 290 of the options 266 that are associated with the menu 222a of options. That is, when the user first starts interacting with the vendor's or developer's software application 202, the software application 202 is programmed or coded to initially present a full suite of the options 266 in response to the user's initial swiping motions 210. However, as the electronic database 250 logs the characteristics of the user's swiping motions 210 and her selections within the menu 222a of options (as above explained), over time the information handling system 100 and/or the software application 202 learns the user's preferences 224. In other words, repeated logging of the swiping motions 210 and the selections within the menus 222 of options allows prediction of future selections based on historical analysis. When current usage matches historical usage, such as within some predefined or configurable threshold value, the information handling system 100 and/or the software application 202 may cull, reduce, and/or eliminate some possible selections within the menus 222 of options. FIG. 10 thus also illustrates the menu 222b of options having only a subset 292 of the options 266 that are learned from usage over time from. The logical rules 280 may thus cause the information handling system 100 and/or the software application 202 to learn the user's preferences 224 and to predict one or several of the most probable selections from the user.

Usage probabilities may be determined. When the software application 202 is initially loaded, the software application 202 may initially define or offer the initial set 290 of the options 266 that are associated with the menu 222a of options. As the user interacts with the software application 202, the information handling system 100 and/or the software application 202 monitors the number of times (weightage of the action) that any particular option 266 is selected. For example, over the user may select the "Reply" option at least fifty (50) times, but in the same period of time the "Forward" option was only selected thirty (30) times. These tallies or counts may be used as coefficients for a linear regression to predict future, probable outcomes. By using linear regression, the information handling system 100 and/or the software application 202 may identify a probability of a particular option 266 being used (as compared to other options). For example, the information handling system 100 and/or the software application 202 may identify the probability that "Reply" is selected more than "Delete" and "Move" options. This probability is calculated for every option 266 defined by the vendor for the initial set 290. Over time, then, lesser used options 266 in the menu 222 of options may be initially hidden from view and exposed by scrolling inputs. The lesser used options 266 may thus not be displayed unless further user inputs are received (such as selecting an ellipsis as an option 266).

Exemplary embodiments thus present an elegant solution. Menu management is quickly and easily implemented using the tactile swiping motion 210. The gestural swiping motion 210 is easily learned and perfected, thus requiring minimal physical and cognitive capabilities. Moreover, the direction 220 and length 240 of the swiping motion 210 may be configured to display its corresponding menu 222 of options. As the software application 202 gains familiarity with the user's usage patterns, the arrangement or ordering of the options 266 offered within the menu 222 of options may be tailored to suit the user's historical observances. The user's most likely or probable selections, in other words, may be prominently offered. Less popular selections may be de-emphasized or even culled from presentation.

Figure 11:
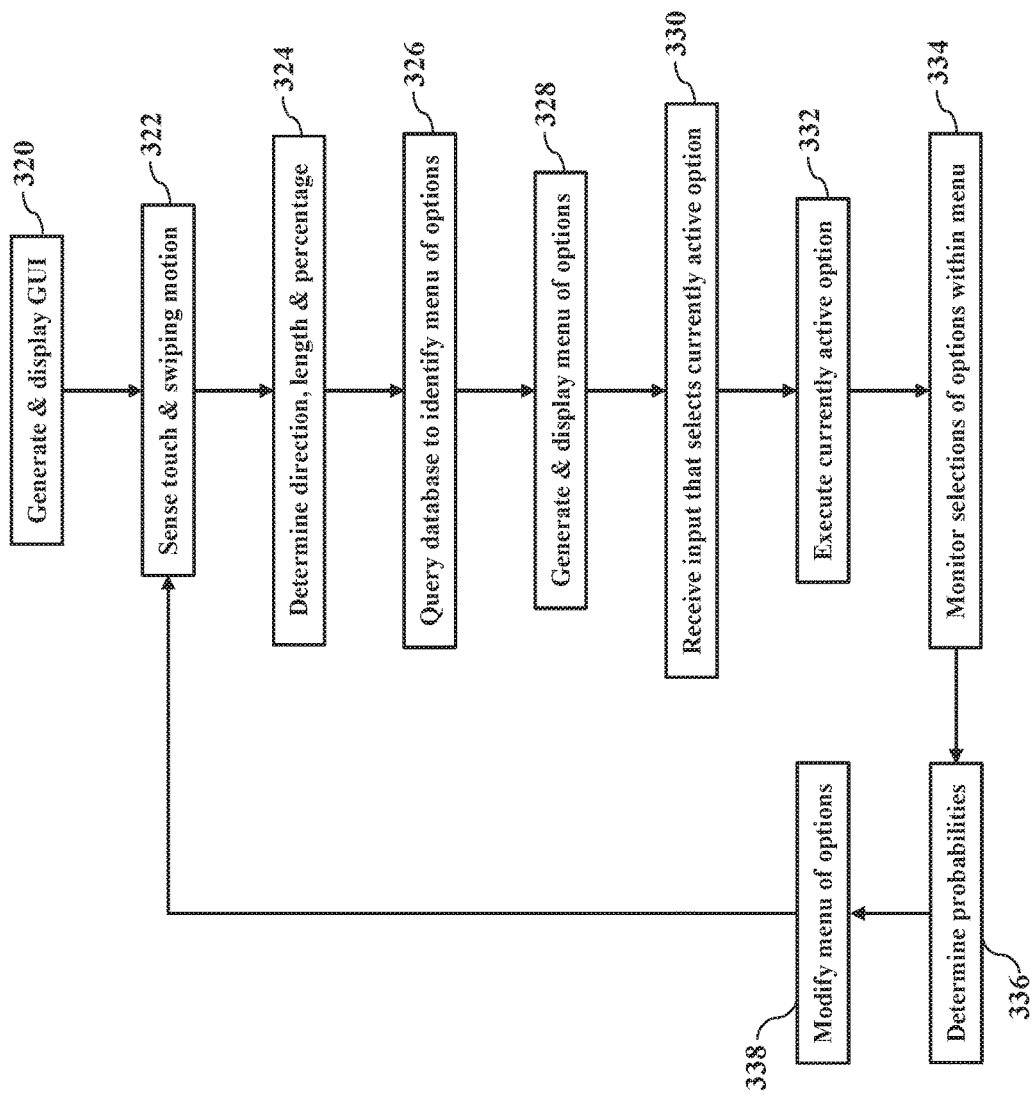
FIG. 11 shows a method or algorithm for graphical menu configuration, according to exemplary embodiments.

FIG. 11 shows a method or algorithm for graphical menu configuration, according to exemplary embodiments. The graphical user interface 204 is generated and displayed (Block 320). The user's swiping motion 210 is sensed (Block 322). The direction 220 and the length 240 associated with the swiping motion 210 is determined (Block 324). The electronic database 250 is queried to identify the corresponding menu 222 of options (Block 326). The menu 222 of options is generated and displayed (Block 328). An input is received that selects the option 266 (Block 330), and the option 266 is executed (Block 332). Over time the options 266 within the menu 222 of options are monitored (Block 334). Probabilities associated with each option 266 are determined (Block 336). The menu 222 of options is modified based on the probabilities associated with each option 266 (Block 338).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of the information handling system can include one or more storage devices that can store machine-executable code, one or more communications ports for communicating with external devices, and various input and output (I/O) devices, such as a keyboard, a mouse, and a video display. The information handling system can also include one or more buses operable to transmit information between the various hardware components.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
    capacitively sensing, by an information handling system, an input to a touch sensitive display;
    determining, by the information handling system, a length associated with the input to the touch sensitive display;
    determining, by the information handling system, a software application associated with the input to the touch sensitive display;
    identifying, by the information handling system, a menu of options by querying an electronic database for the length and for the software application associated with the input to the touch sensitive display, the electronic database electronically associating menus to lengths and software applications including the menu of options associated with the length and for the software application associated with the input to the touch sensitive display;
    displaying, on the touch sensitive display, the menu of options;
    capacitively sensing, by the information handling system, inputs to the touch sensitive display that correspond to selections from the menu of options;
    determining, by the information handling system, a preferred option from the menu of options based on the software application and a direction of the inputs to the touch sensitive display that correspond to the selections; and
    modifying the menu of options based on the preferred option.

2. The method of claim 1, further comprising displaying a graphical user interface.

3. The method of claim 1, further comprising displaying a listing of content.

4. The method of claim 1, further comprising ranking the options in the menu of options based on the software application and inputs.

5. The method of claim 1, further comprising removing at least one of the options in the menu of options.

6. The method of claim 1, further comprising actively displaying the preferred option.

7. A system comprising:
    a hardware processor; and
    a memory device storing instructions that when executed by the hardware processor perform operations, the operations including:
        capacitively sensing a swiping motion to a touch sensitive display;
        determining a length associated with the swiping motion to the touch sensitive display;
        determining a software application associated with the input to the touch sensitive display;
        identifying a menu of options by querying an electronic database for the length and for the software application associated with the input to the touch sensitive display, the electronic database electronically associating menus to lengths and software applications including the menu of options associated with the length and for the software application associated with the input to the touch sensitive display;
        displaying the menu of options;
        capacitively sensing inputs to the touch sensitive display that correspond to selections from the menu of options;
        determining an option of the options in the menu of options based on the software application and a direction of the inputs to the touch sensitive display that correspond to the selections; and
        modifying the menu of options based on the option.

8. The system of claim 7, wherein the operations further include determining probabilities associated with the options in the menu of options.

9. The system of claim 7, wherein the operations further include reducing the options in the menu of options based on probabilities associated with the options.

10. A memory device storing instructions that when executed by a hardware processor perform operations, the operations including:
    presenting a listing of content by a touch sensitive display;
    capacitively sensing an input to the touch sensitive display;
    interpreting the input as a selection of an entry in the listing of content presented by the touch sensitive display;
    capacitively sensing a swiping motion along the entry in the listing of content;
    determining a length associated with the swiping motion;
    determining a software application associated with the swiping motion;
    identifying a menu of options by querying an electronic database for the length and for the software application associated with the swiping motion, the electronic database electronically associating menus to lengths and software applications including the menu of options associated with the length and for the software application associated with the input to the touch sensitive display;
    displaying the menu of options by the touch sensitive display;
    capacitively sensing inputs to the touch sensitive display that correspond to selections from the menu of options;
    determining an option of the options in the menu of options based on the software application and a direction of the inputs to the touch sensitive display that correspond to the selections; and
    modifying the menu of options based on the option.

11. The memory device of claim 10, wherein the operations further include determining probabilities associated with the options in the menu of options.

12. The memory device of claim 11, wherein the operations further include capacitively sensing a selection of the option.

13. The memory device of claim 12, wherein the operations further include executing the option.

14. The memory device of claim 10, wherein the operations further include reducing the options in the menu of options based on probabilities associated with the options.

* * * * *